Dec. 10, 1957          H. HILBER          2,815,835
ENGINE STARTER AND TOE BRAKE ACTUATOR FOR MOTORCYCLES
Filed June 21, 1954          4 Sheets-Sheet 1
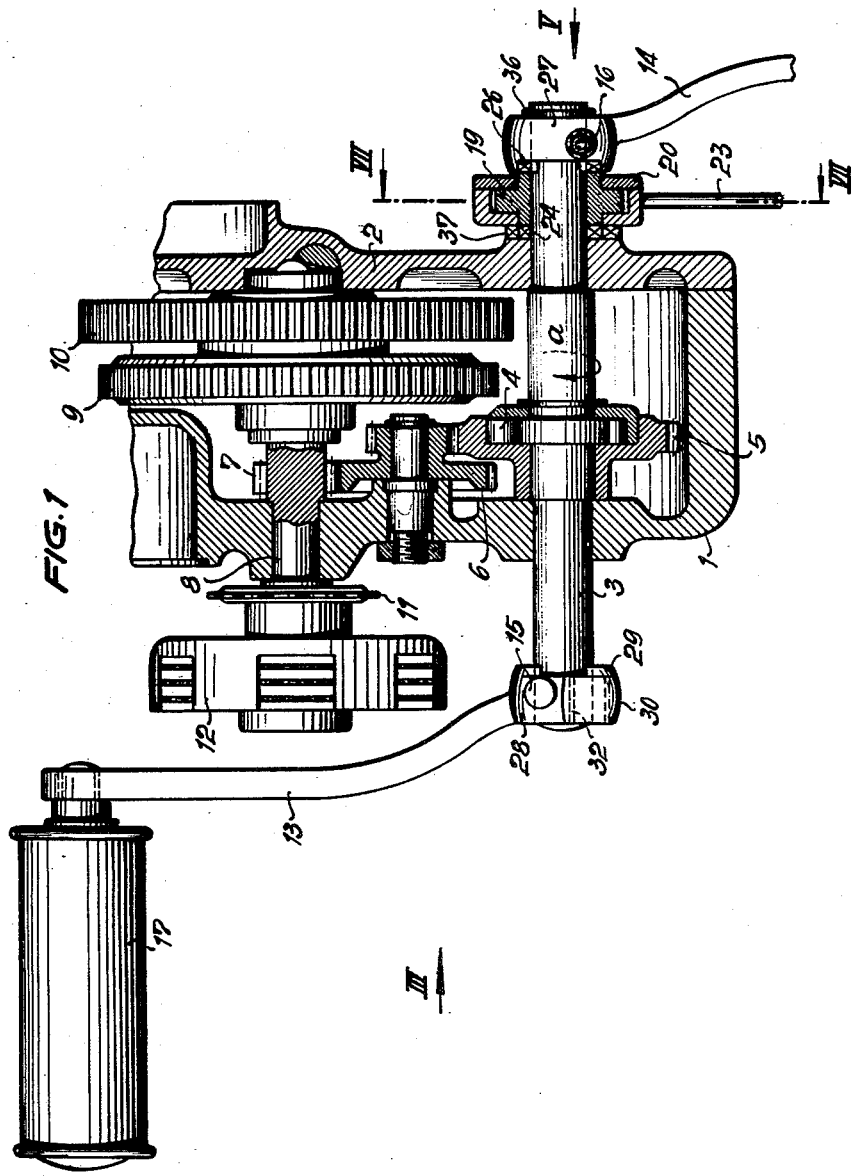
INVENTOR
Hanns Hilber
By Ernest J Montague
attorney

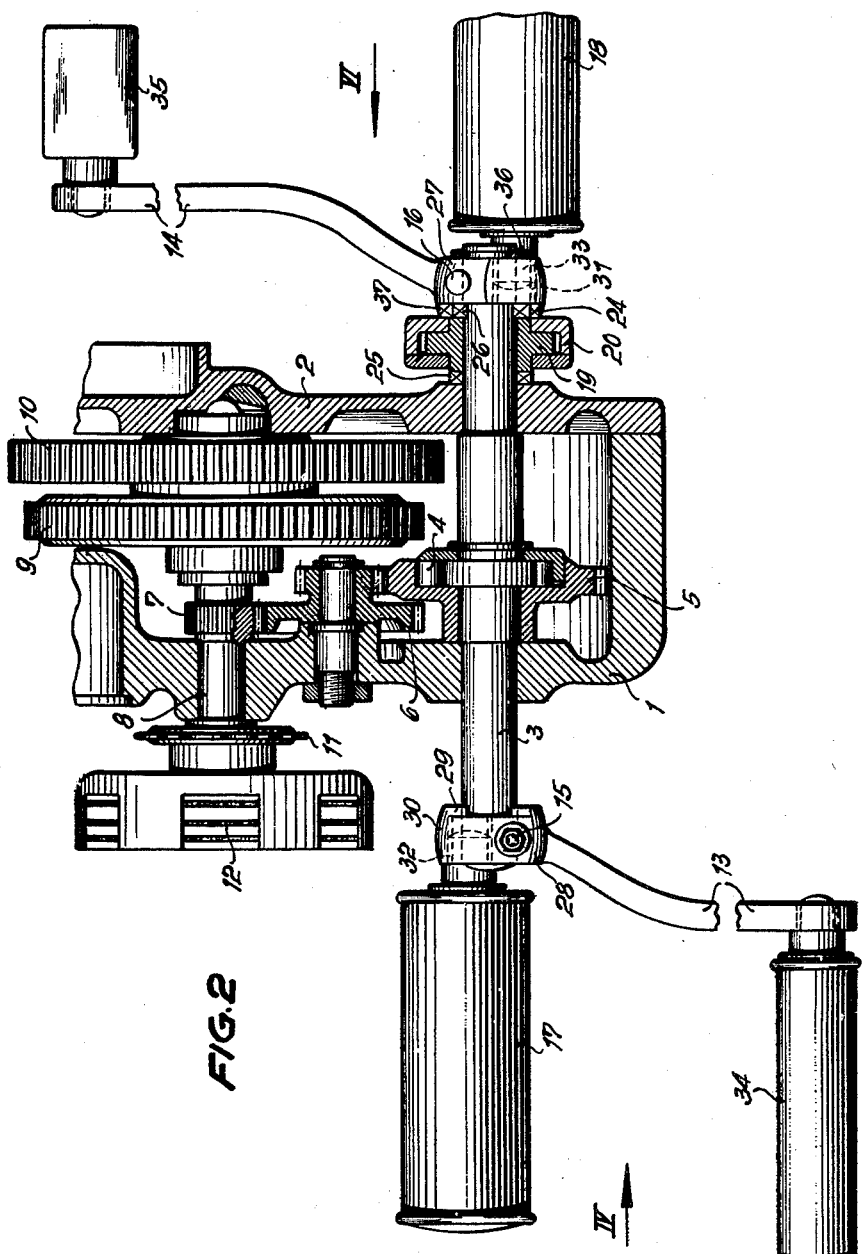

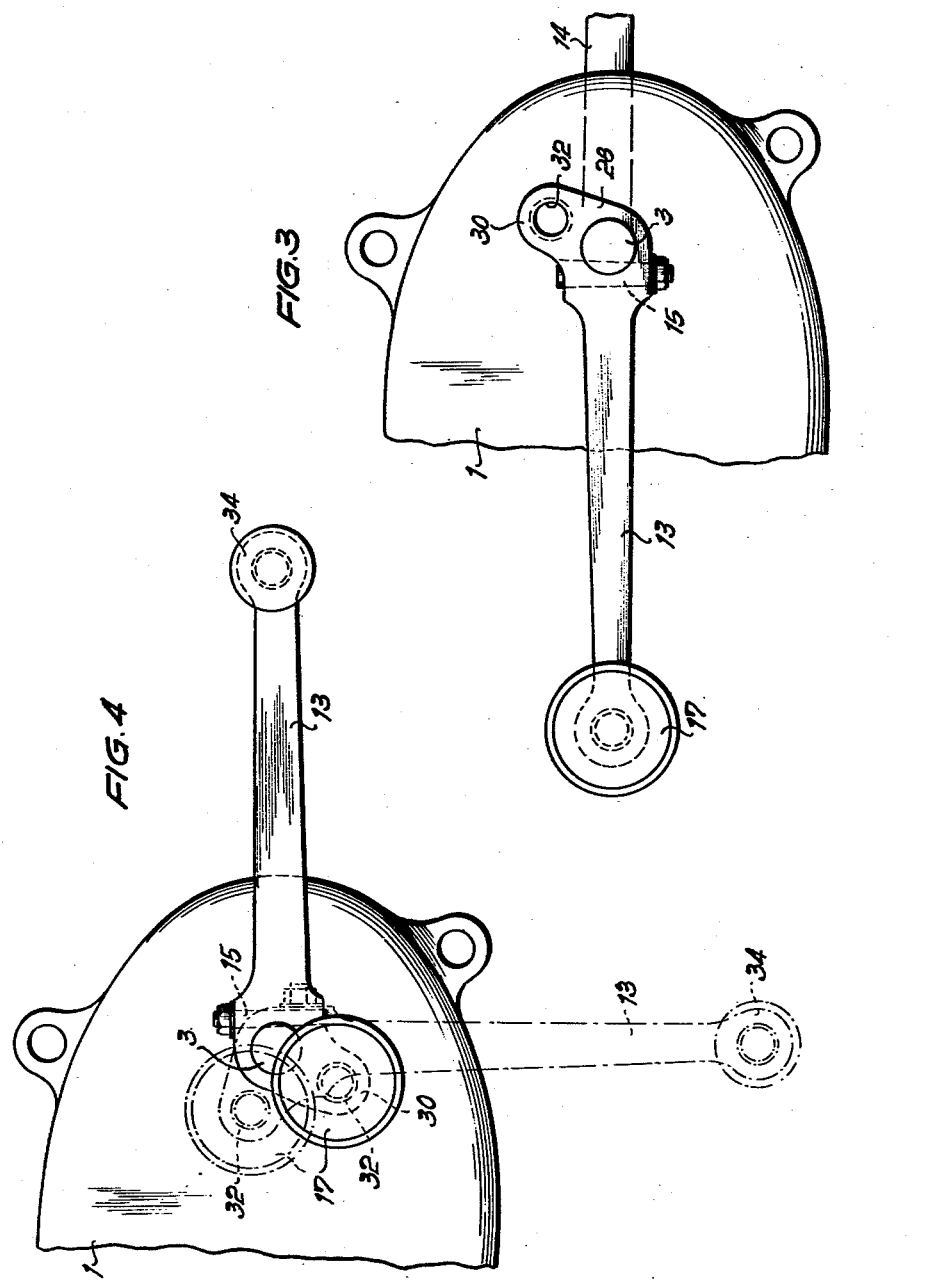

Dec. 10, 1957     H. HILBER     2,815,835
ENGINE STARTER AND TOE BRAKE ACTUATOR FOR MOTORCYCLES
Filed June 21, 1954     4 Sheets-Sheet 4
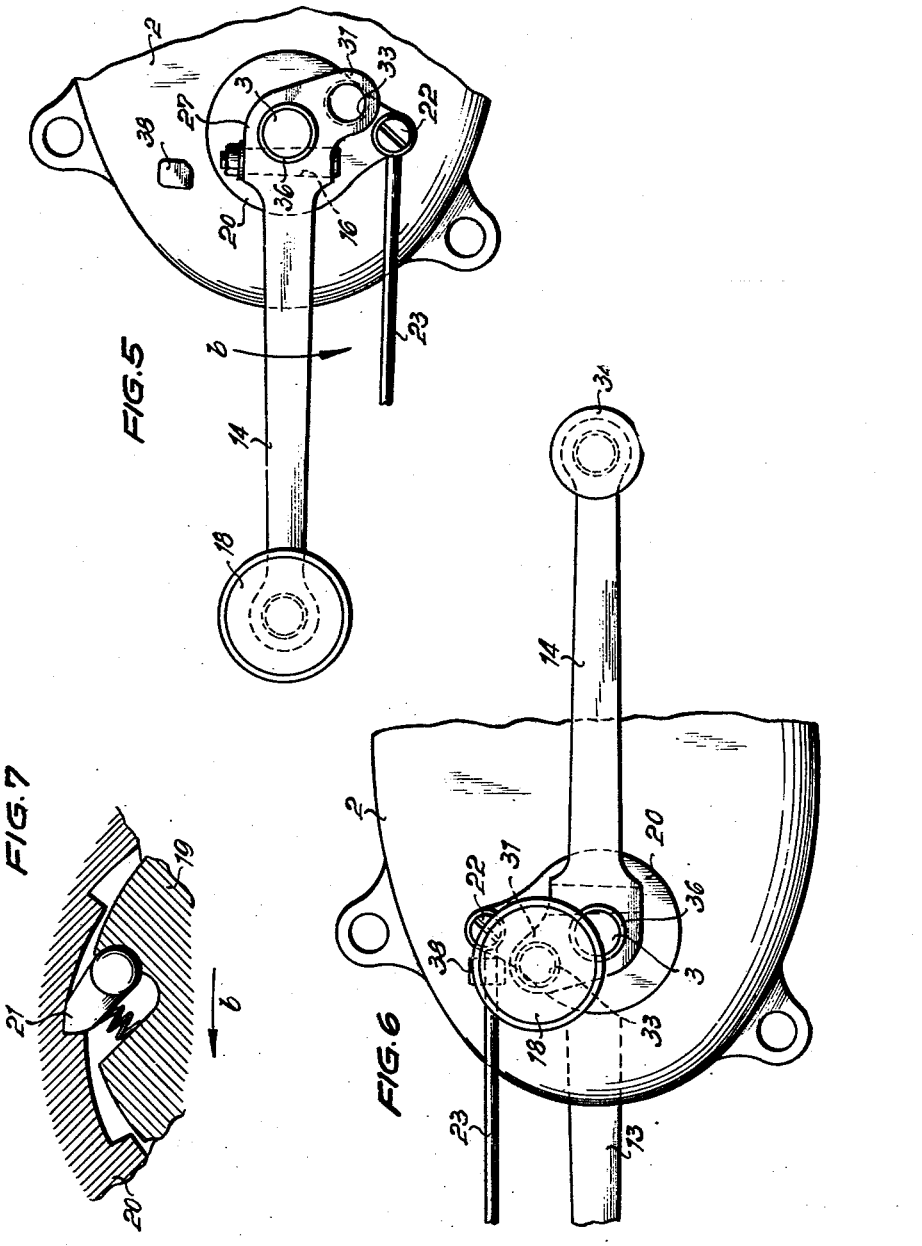
INVENTOR
Hanns Hilber
By Ernest Montague
Attorney

United States Patent Office 2,815,835
Patented Dec. 10, 1957

2,815,835

ENGINE STARTER AND TOE BRAKE ACTUATOR FOR MOTORCYCLES

Hanns Hilber, Stuttgart, Germany, assignor to Alfred Kreidler, Stuttgart, Germany Application June 21, 1954, Serial No. 438,185

4 Claims. (Cl. 192—4)

The present invention concerns motorcycles.

It is known to fit motorcycles with a pedal crank which operates on the engine through a freewheel clutch and the reduction gear and, when back-pedalling, through a ratchet clutch and transmission means, operates on the rear wheel brake. Such engine-assisted pedal cycles frequently have an advantage over normal motorcycles having fixed foot rests, either because their mode of use appears more normal to those who have hitherto ridden pedal cycles, or because official regulations in many countries favour such vehicles fitted with pedal cranks. On the other hand, however, a motorcycle having fixed foot rests has many advantages with respect to the technique of driving, so that even the owners of engine-assisted pedal cycles soon express a desire for a light motorcycle or to convert their engine-assisted pedal cycle.

An object of the present invention is to meet the requirements which vary according to the demands of the users and the regulations of individual countries and to produce a vehicle which can be driven after slight adjustment, both as an engine-assisted pedal cycle and as a light motorcycle.

According to the present invention in a motorcycle having pedal cranks the rigid connection between the two pedal cranks is made disconnectable in such a manner that one crank can be used through the freewheel clutch and the gear as a kick starter and the other pedal crank through the ratchet clutch and the transmission means for operating the brake.

It is indeed already known to make one crank replaceable in an alternative position on the pedal crankshaft so that by turning it through 180° it is parallel with the other, the two pedals being then used as fixed foot rests. This solution, of which many variations are known, is however not very fortunate, for the pedals thus fixed in parallel as foot rests are disposed in a position which is not comfortable for the driver and, moreover, involves new additional difficulties in starting and braking. On the other hand, it is different in the case of the motorcycle in accordance with the invention: here the two pedal cranks are not arranged fixedly, and one is used as a kick starter lever after readjustment and the other as a foot brake actuating lever. The feet of the driver, are moreover supported during travel in a different manner.

It has proved to be advisable to provide the pedal crank with suitable attachment means (threaded holes) in the longitudinal direction of its shaft for screwing in foot rests, whilst it is preferable to use the pedals removed from the crank and which may also be constructed as round pedals, if required. Furthermore, it is an advantage to arrange the threaded hole, at least on the starter side, somewhat eccentrically to the axis of the pedal crank. In this manner the pedal crank used as a kick starter lever, and which owing to the freewheel clutch associated with the pedal crank, hangs down after starting and repositioning, is raised for improving clearance from the ground when the feet are placed on the screwed-in foot rests.

If, as already mentioned, the pedals are screwed into the pedal cranks as foot rests, it becomes important to provide separate control pedals for brake and kick starter which can be screwed into the corresponding pedal cranks and which are carried when not in use in threaded holes at a suitable place on the cycle frame.

The invention will be described further, by way of example, with reference to the accompanying drawings, in which:

Fig. 1 is a horizontal part section through the gear of a vehicle in accordance with the invention when used as an engine-assisted pedal cycle;

Fig. 2 shows the same section when the vehicle is used as a motorcycle, that is to say having fixed foot rests;

Fig. 3 is a fragmentary side elevation viewed in the direction of the arrows III of Fig. 1;

Fig. 4 is a fragmentary side elevation viewed in the direction of the arrow IV of Fig. 2;

Fig. 5 is a fragmentary side elevation viewed in the direction of the arrow V of Fig. 1;

Fig. 6 is a fragmentary side elevation viewed in the direction of the arrow VI of Fig. 2; and Fig. 7 is a part section on the line VII—VII of Fig. 1 on a considerably increased scale.

The pedal crankshaft 3 is mounted in a gear housing 1 and its cover 2. A gear wheel 5 is connected to the pedal crankshaft by means of a freewheel clutch 4 so as to be driven thereby when the pedal crankshaft rotates in the direction of the arrow $a$ (Fig. 1). The gear wheel 5 operates through a transmission gear 6 and a pinion 7 of the driven shaft 8. The latter has two gear wheels 9 and 10 either which can be smoothly coupled to the driven shaft 8 to provide alternative gear ratios. This change speed gear as such is of no interest in connection with the invention. In their turn these wheels 9 and 10 mesh with counter wheels (not shown) on the engine crankshaft. The driven chain wheel 1 may be disengaged from the driven shaft 8 by a disengageable clutch 12.

The pedal crankshaft 3 has pedal cranks 13 and 14 on its left side and right side, respectively. In the form of construction of an engine-assisted pedal cycle shown in Figs. 1, 3, 5 and 7 both pedal cranks are firmly connected to the pedal crankshaft 3 by cotters 15 and 16. The pedals 17 and 18, which may be of round construction, are screwed to the ends of the cranks.

On the right the crankshaft 3 carries a ratchet clutch for the brake rods of the rear wheel brake between the cover 2 of the housing and the crank 14. The ratchet clutch consists of a clutch hub 19 and a housing 20. A spring loaded pawl 21 (see Fig. 7) which co-operates with a complementary internal ratchet on the housing 20 of the ratchet clutch during back-pedalling (arrow direction $b$), is mounted in the clutch hub 19. When pedalling forward the housing of the ratchet clutch remains stationary. The tension rod 23, which leads to the rear wheel brake, is hinged to a lug 22 disposed on the housing 20 of the ratchet clutch. The hub 19 has claws or serrations 24 and 25 on both its side faces. Counter claws or serrations 26 on the inner face of the boss 27 of the crank 14 engage with the claws or serrations 25 in the construction as an engine-assisted pedal cycle. In order to have the two pedal cranks interchangeable, the left hand pedal crank 13 has these claws or serrations 29 on the inner face of its boss 28 where of course they do not perform any function. Both pedal cranks 13 and 14 carry moreover, somewhat eccentrically on their bosses 27, 28, lugs 30, 31 having threaded holes 32, 33 fitting the threaded pins of the pedals 17, 18.

The thus constructed vehicle may be started by operating the pedals 17, 18, like normal engine-assisted pedal cycles, until the engine comes into operation. The engine may also be started, with the clutch 12 disengaged and the vehicle stationary, by energetically treading down either of the pedals 17, 18.

If the vehicle is to be converted into a motorcycle with foot rests (according to Figs. 2, 4 and 6), both pedals 17, 18 are unscrewed and screwed into the threaded holes 32, 33. In place of these pedals 17 and 18 a kick starter pedal 34 is now screwed into the left hand crank and a brake pedal 35 screwed into the right hand crank. It is convenient for these two pedals 34, 35 to be held in corresponding threaded holes at the suitable position on the frame of the vehicle when not in use. The right hand cotter 16 is then removed, the crank 14 drawn off and, after disconnecting the tension rod 23, the ratchet clutch 19—22 is removed. The latter is again slipped on the shaft 3 in the reverse manner, and the crank 14 slipped on again likewise. After fitting a circlip 36, the crank 14, which is now engaged by its serrations 26 with the serrations 24 of the clutch hub 19 and simultaneously with the serrations 27 of the clutch housing 20, is repositioned at the front and the tension rod 23 for the brake hinged to the lug 22 again. The pedal crank 14 now forms with the ratchet clutch 19, 22 a rigid angular lever pivoting on the pedal crankshaft 3 for actuating the brake by pressure from the foot, as a "toe-brake." Finally, a stop cam 38 is also provided on the cover 2 of the gear housing against which cam the ratchet clutch abuts in the off position. By this means the foot finds a firm support on the pedal 18 in spite of the fact that the latter is eccentrically mounted.

The removal of the right hand cotter 16 renders it possible at the same time to reposition the left hand pedal crank 13 to the rear. The action of the freewheel clutch 4 then causes the latter to hang vertically downwards as shown in chain dotted lines in Fig. 4. Before starting, the crank 13 is swung forwards obliquely upwards, and energetically trodden down with the clutch 12 disconnected. The engine is started by the gear connection 5—9 or 5—10 (depending on the gear ratio selected). The pedal crank 13 is subsequently raised and returned to the rear where it again adopts the chain dotted position shown in Fig. 4. However, as soon as the driver puts his foot on the pedal 17, the crank 13 is raised owing to the eccentric mounting of the pedal as is shown in full lines in Fig. 4. The driver engages the clutch 12 in the normal manner for starting.

While I have disclosed several embodiments of the present invention, it is to be understood that these embodiments are given by example only and not in a limiting sense, the scope of the present invention being determined by the objects and the claims.

I claim:

1. In a motorcycle, a crankshaft, a gear train adapted to be driven by an engine and including a freewheel clutch operatively connected between said crankshaft and said engine, a casing receiving said gear train and having a cover, a first crank arm mounted on one end of said crankshaft for common rotation therewith and operating as a kick starter for said engine, a second crank arm mounted on the other end of said crankshaft for free rotation in either direction and forming a rigid angular lever, abutment means on said cover to limit the movement of said lever, a tension rod secured to and projecting rearwardly from said second crank arm, said tension rod being adapted to be connected with a wheel brake, said second crank arm operating as a toe-brake actuator, and both said crank arms being adapted to be used as pedal cranks by fixedly securing said second crank arm to said crankshaft and operating said brake device by means of backpedaling.

2. The motorcycle, as set forth in claim 1, wherein said crank arms have bosses and the latter have threaded holes, and pedals having threaded pins, said pins being received in said holes, so that said pedals operate as foot rests, and said pedals being adapted to be secured to the remote end of said crank arms, if used in a pedal cycle.

3. The motorcycle, as set forth in claim 1, wherein said pedals are disposed eccentrically on the bosses of said crank arms.

4. The motorcycles, as set forth in claim 1, wherein said rigid angular lever includes a ratchet clutch having serrations on both its side faces, and the inner face of said bosses having serrations complementary to said serrations of said ratchet clutch, so that upon forward pressing of said second crank arm, the latter operates as a toe-brake actuator.

References Cited in the file of this patent
UNITED STATES PATENTS

| | | |
|---|---|---|
| 1,097,546 | Harley | May 19, 1914 |
| 2,186,816 | Bernier | Jan. 9, 1940 |